No. 655,320. Patented Aug. 7, 1900.
J. C. ANDERSON.
AUTOTRUCK FOR GARBAGE, ASHES, &c.
(Application filed Sept. 23, 1899.)
(No Model.) 3 Sheets—Sheet 1.
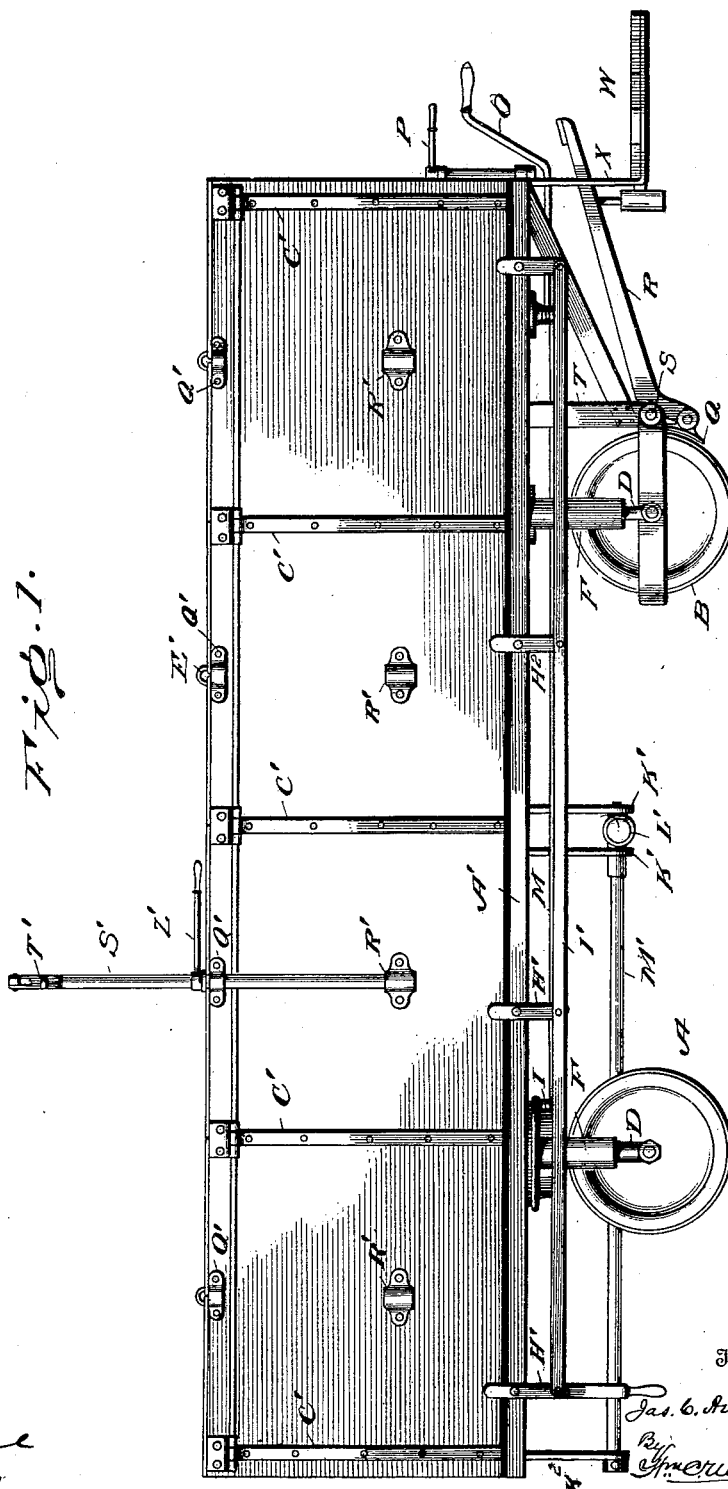
Witnesses
Inventor
Jas. C. Anderson
By
Attorney No. 655,320. Patented Aug. 7, 1900.
J. C. ANDERSON.
AUTOTRUCK FOR GARBAGE, ASHES, &c.
(Application filed Sept. 23, 1899.)
(No Model.) 3 Sheets—Sheet 2.
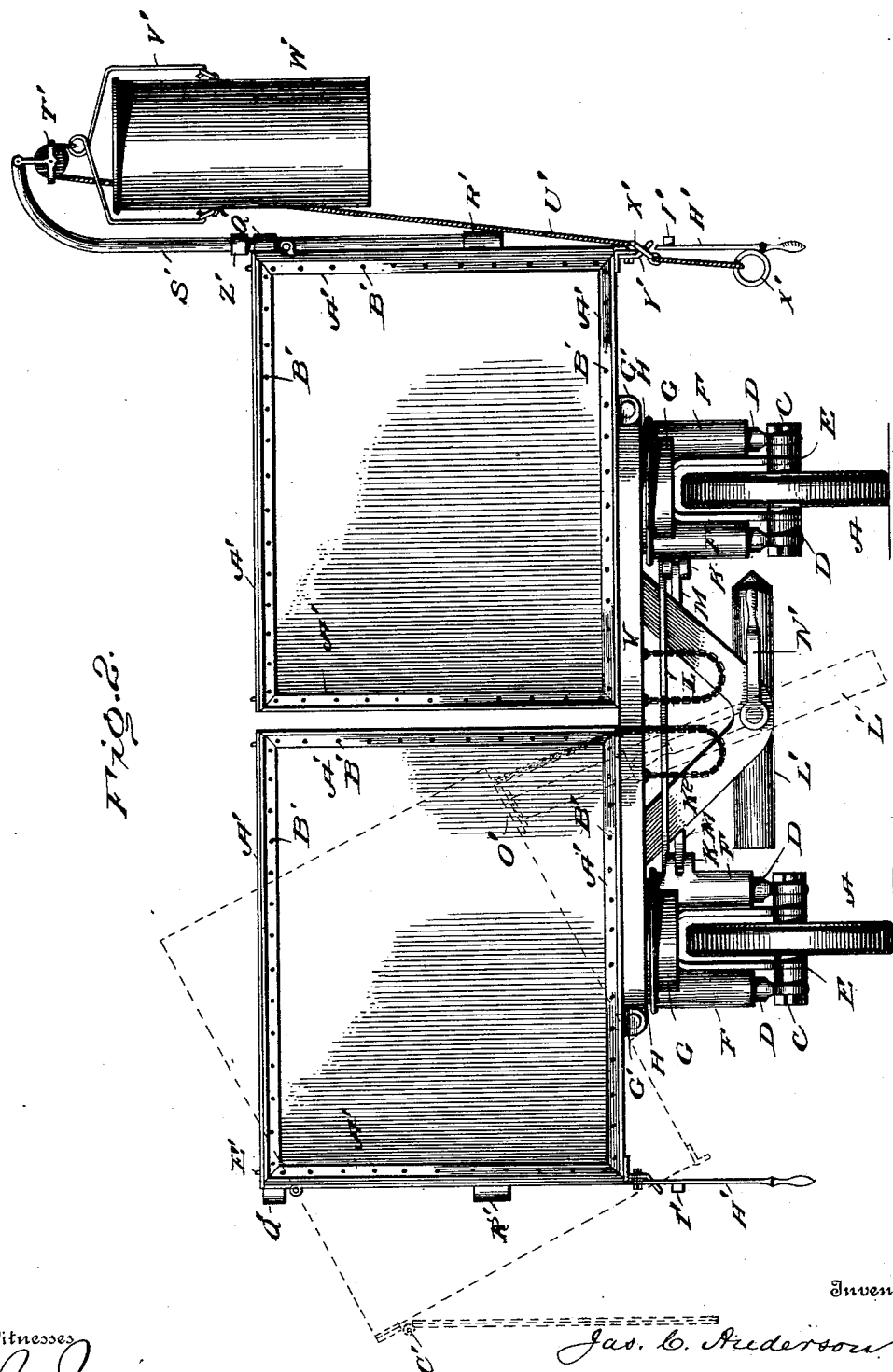

No. 655,320. Patented Aug. 7, 1900.
J. C. ANDERSON.
AUTOTRUCK FOR GARBAGE, ASHES, &c.
(Application filed Sept. 23, 1899.)
(No Model.) 3 Sheets—Sheet 3.
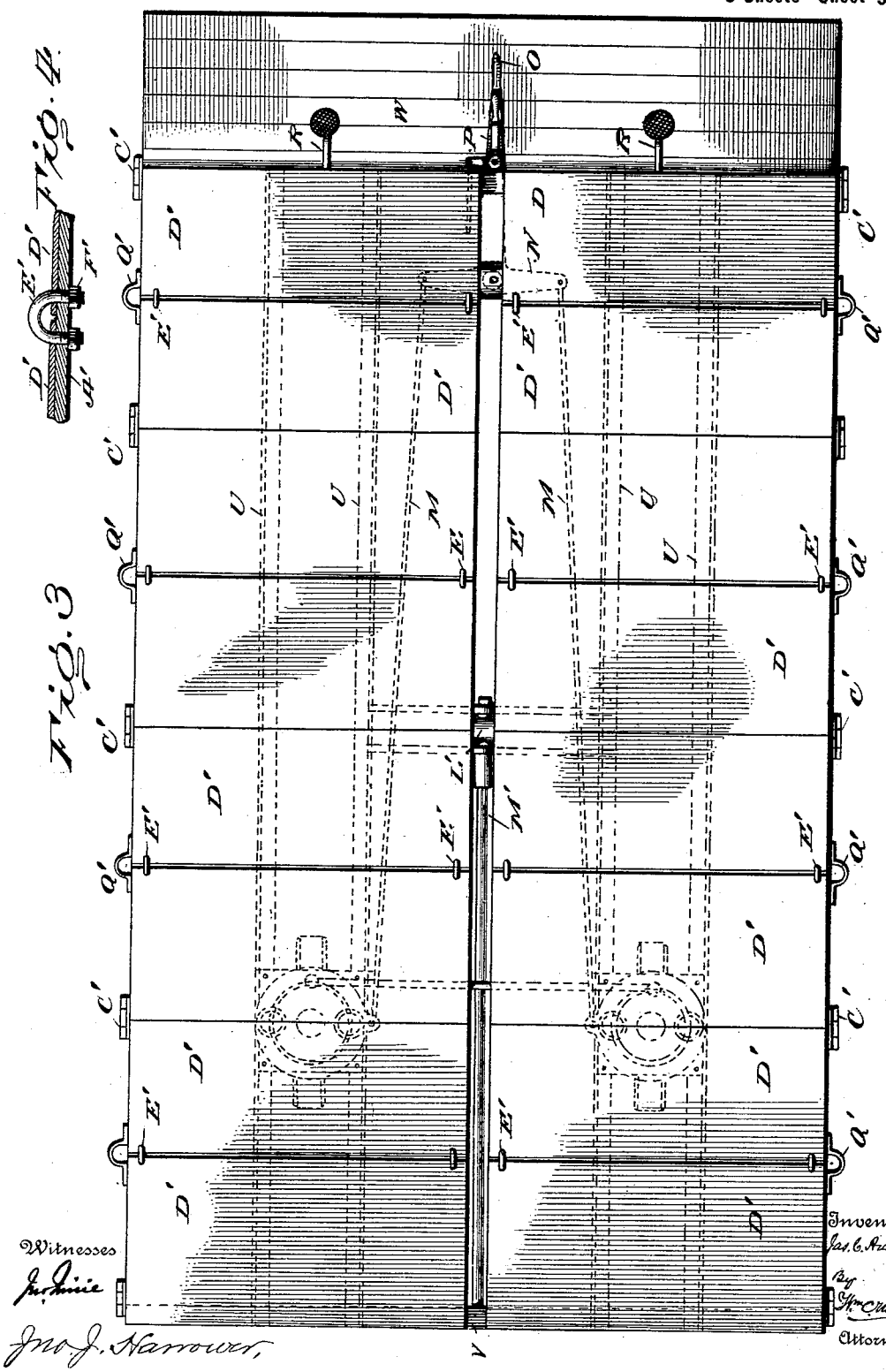

UNITED STATES PATENT OFFICE.

JAMES C. ANDERSON, OF HIGHLAND PARK, ILLINOIS.

AUTOTRUCK FOR GARBAGE, ASHES, &c.

SPECIFICATION forming part of Letters Patent No. 655,320, dated August 7, 1900.

Application filed September 23, 1899. Serial No. 731,461. (No model.)

*To all whom it may concern:*

Be it known that I, JAMES C. ANDERSON, a citizen of the United States, residing at Highland Park, in the county of Lake and State of Illinois, have invented certain new and useful Improvements in Autotrucks for Garbage, Ashes, &c.; and I do hereby declare the following to be a full, clear, and exact description of the invention, such as will enable others skilled in the art to which it appertains to make and use the same.

My invention relates to that class of vehicles usually employed in large cities and towns for collecting and transporting garbage, ashes, street-sweepings, and other refuse matter.

In the use of the ordinarily-constructed vehicle the carrying capacity of the vehicle is necessarily limited owing to the employment of animal draft-power, and consequently large numbers of vehicles are required to transport a given quantity of material. The use of a multiplicity of vehicles involves very serious objections outside of the cost—viz., the complaints from residents along the route of travel as to a "procession" of malodorous and unsightly vehicles and the great difficulty of unloading at the concentrating point or dump of numbers of vehicles arriving in rapid succession or at substantially the same time. This difficulty has been a matter of personal experience in the city of Chicago, where one hundred and twenty-five loaded vehicles have arrived at the dump or place of deposit within thirty minutes or less, rendering it impossible to unload the vehicles without great loss of time and consequent expense. At the place of deposit for all such refuse material it is customary to provide an elevated "runway" or platform upon which the vehicles are driven up one incline for unloading and down an incline at the opposite end after depositing the load, and hence with a large number of vehicles such runway would of necessity have to be unreasonably and absurdly long to accommodate a large number of vehicles. Attempts have been made to avoid this difficulty by constructing vehicles of comparatively-large capacity, but still limited by reason of the motive force (animal) employed to move such vehicles. An inherent defect, however, resided in the fact that the length of the vehicles prevented dumping at an angle sufficient to insure the gravity of the contained material, and it became necessary to rake or hook out the same, which procedure involved so much time as to constitute a condemnation of the vehicle.

My invention has for its object to overcome all of the recited disadvantages existing in garbage-vehicles and to produce a vehicle which shall have large capacity and which can be economically and expeditiously loaded and unloaded; and with these ends in view my invention consists of a vehicle having a body made in two longitudinal sections, with hinged covers and sides, the sections being vibratively mounted upon a truck having driving and steering wheels and provided with a motor for operating the driving-wheels.

My invention consists, further, in providing the vehicle with a removable and adjustable crane and bucket for loading the vehicle.

My invention consists, further, in combining with the sectional and vibrating body-sections and the truck upon which they are mounted an adjustable jack adapted to tilt or vibrate the respective body-sections.

My invention consists, further, in the details of construction and arrangement of the several parts of the vehicle, all as will be hereinafter more fully described.

In order that those skilled in the art may fully understand my invention and all of its advantages, I will proceed to describe the construction, operation, and method of using the same, referring by letters to the accompanying drawings, in which—

Figure 1 is a side elevation of my improved vehicle. Fig. 2 is a rear end view. Fig. 3 is a top or plan view; and Fig. 4 is a detail view, partly in section, illustrating the manner of hinging the covers to the body.

Similar letters of reference denote like parts in the several figures of the drawings.

The truck or running-gear consists of rear steering-wheels A A and forward driving-wheels B B, mounted upon axles C, which are supported by spring-pistons D, forks E, and spring-cylinders F, the latter formed with a cylindrical head G, rotating on ball-bearings between it and a sole-plate H, all constructed and arranged as described in an application filed by me on the 5th day of September, 1899, Serial No. 729,484, for improvement in motor-cars, and provided with lugs I on the head G and lugs K on the inside spring-cylinders F, a link-bar L between the lugs I, and steering-rods M between the lugs K, and a horizontal rocking lever N, operated by a hand-lever O, all as fully described in another pending application filed by me on the 23d day of September, 1899, Serial No. 731,462, for improvement in an autotruck-vehicle.

An air, gasolene, or other suitable motor is secured to the frame of the running-gear and geared to the driving-wheels B and controlled by a hand-lever P. Brake-shoes Q, pivoted in the ends of foot-levers R, secured on a rock-shaft S, mounted in legs T, are adapted to contact with the driving-wheels B. The foot-lever R is held in its normal position by a pneumatic spring secured to the platform-frame.

The frame or running-gear consists of four longitudinal channel-beams U, arranged in pairs, as shown in broken lines at Fig. 3, connected at the ends with transverse channel-beams V, and braced intermediate of the ends, if necessary, by suitable bridge beams or rods. The end beams extend slightly beyond the two outside longitudinal beams to constitute lugs for the purpose presently described.

The sole-plates H hereinbefore referred to are secured to and between the longitudinal beams, as shown in dotted lines at Fig. 3, and the spring-cylinders F, over the driving-wheels B, are similarly secured in place. At the front end of the frame a footboard W is secured in place on the horizontal arms of a frame X, bolted to the end beams, and said footboard constitutes a platform for the driver or operator.

The body of the vehicle consists of two independent longitudinal rectangular sections, the frames of which consist of channel-beams, all securely bolted or riveted together. The inner sides, bottoms, and ends are secured in place to the channel-beams by suitable screw-bolts or rivets B', as clearly shown at Fig. 2. The outer sides of the two sections of the body are vibratively connected at their upper edges to the upper channel-beams of the frames by hinges C', as clearly shown at Fig. 1, one leaf of which extends entirely across the sides to strengthen and support the same. The covers are made in sections D' and are hinged in pairs to the upper channel-beams A' of the frames by curved staples E', secured in place by screw-nuts F', as clearly shown in Fig. 4.

Extending vertically from the lower end beams of the body-frames are lugs G', which are pivotally connected to the lugs formed on the projections, heretofore referred to, on the end beams V of the running-gear frame and as clearly shown at Fig. 2. The hinged sides of the body-sections fit against a suitable rubber packing on the lower longitudinal beams of the body-frame and are held in close contact therewith by a series of latches H', pivoted to the lower beams A' of the frame. These latches are also pivoted to a horizontal connecting-bar I', and the end latch is extended below the bar I' and provided with a handle-bar for operating all the latches through the medium of the connecting-bar in an obvious manner.

I desire to call especial attention to the fact that the lugs G' on the lower end beams of the body-frames are so located between the longitudinal center and outside plane of said frames that the body-sections may be tilted upon the pivotal connections at such an angle as to secure the dumping by gravity alone of its contents and so that comparatively a small degree of power will be necessary to lift said bodies, while at the same time they will when unloaded readily return to their normal position by gravity, and as the two bodies are similarly arranged on the truck-frame it is apparent that they will counterbalance each other and hold the truck-frame against capsizing, which result would necessarily ensue if only one tilting body were projected with its load over the side of the truck-frame.

To the two inside longitudinal beams U of the running-gear frame are secured two V-shaped brackets K', and a similar bracket K² is likewise secured at the rear end of the frame, as clearly shown at Figs. 1 and 2. A lifting-jack L' is pivotally mounted in the lower ends of the brackets K', and an operating-stem M', with a handle N', is journaled and supported in the lower end of end bracket K². The lifting-jack is arranged centrally of the running-gear frame, as clearly shown, and its piston has its head made of conical form to fit in a recess in a plate O', (shown in dotted lines at Fig. 2,) secured to the under side of the bottom of each section of the body, so that through the medium of the handle N' and stem M' the jack may be swiveled to bring the piston in contact with the plate O' of either section, and the rise of the piston will cause the section to vibrate upon its pivotal connection, as shown in dotted lines at Fig. 2, and to such an extent as to dump the contents of the body when the swinging sides have been released by latches H'.

Safety-chains P', connected to the body-sections and the longitudinal running-gear beams U, limit the vibrations of the body-sections in an obvious manner, and as the axis of vibration is outside of the longitudinal center of the body-sections it is apparent that when the load has been dumped and the jack released the sections will, as before stated, return by gravity to their normal position, and at the same time the swinging sides under the same law will return to their closed position, where they will be again held by the latches H'.

At suitable and convenient distances apart keepers Q' are secured to the outer and upper longitudinal beam of each of the body-frames and in the same vertical plane. Similar keepers R' are secured to the swinging sides. These keepers are designed to sustain a removable rotary crane S', provided at its upper curved end with a swinging pulley T', over which traverses a rope U', secured by a hook or otherwise to the bail V' of a loading-can W'. The bail V' may be a part of a specially-constructed can, or it may be made to interlock with ring-handles on the ordinary domestic street ash-cans. The rope U' is provided at its lower end with one or two rings X', adapted for use in hauling upon the rope and also to interlock with projecting arms or hooks Y', secured to the lower edge of the body-frames.

The crane is provided with a radial arm Z', by which it may be easily rotated within the keepers Q' R', and as said handle is rigidly connected by a set-screw or otherwise to the crane it also constitutes an annular stop or shoulder to limit the vertical movement of the crane. From the construction described it will be seen that in loading the vehicle the crane may be placed at various points between the ends of the body and swung out into position to elevate the can W', and when the latter has been lifted to the proper height and the rope R' held by interlocking the ring X' with the hook Y' the radial arm Z' may be used to rotate the crane S' to such an extent as to first bring the lower portion of the can W' in contact with the side of the body and to subsequently tilt or dump the contents of the same into the body. As the vehicle is gradually or completely loaded the hinged covers are tightly closed to prevent the escape of any odor or fumes, and as the sides, bottom, and ends of the body are equally odor-proof it will be seen that the vehicle will be unobjectionable for the purposes designed. After the vehicle is loaded in the manner described and the lids or covers are tightly closed the operator mounts the footboard or platform W and grasping the handle or lever P applies the power for the propulsion of the vehicle in either direction but preferably with the steering-wheels in the rear, and by means of the lever O he guides or steers in any desired direction and is also in position to press either one of the foot-levers R to apply the brakes when necessary. When the vehicle has reached the "dump," it is moved up onto the runway, the width of which is proportioned to the width of the vehicle, and then by means of the jack N' the loads contained in the two sections of the body are automatically dumped on opposite sides of the runway into the chutes provided to receive the material.

Having described the construction, operation, and advantages of my invention, what I claim as new, and desire to secure by Letters Patent, is—

1. An autovehicle composed of two independent longitudinal body-sections provided with hinged sides and vibratively mounted upon a truck in a plane intermediate of their longitudinal centers and their outside vertical planes, and means intermediate of the pivots of said body-sections and their inside vertical planes, for exerting a lifting power to vibrate the body-sections upon their respective pivots, substantially as hereinbefore set forth.

2. In an autovehicle in combination with a truck consisting of a frame mounted upon driving and steering wheels and means for operating the same, and a body composed of longitudinal sections vibratively connected with the truck-frame, a pivoted lifting-jack located below the bottom planes of the body-sections and means for vibrating and operating the same, substantially as and for the purposes set forth.

3. In combination with the truck-frame, vibrating sectional body and pivoted lifting-jack, safety-chains connecting the vibrating body-sections and the truck-frame, substantially as shown and described.

4. In combination with the sectional independent body portions, mounted upon a suitable running-gear, twin covers D', hinged in pairs, through the medium of staples E', secured in position, substantially as described.

5. The lifting-jack L' pivotally mounted in brackets K' secured to the frame of the running-gear, in combination with a stem M' rotatively mounted in a bracket K², and provided with an operating-handle N', substantially as and for the purpose set forth.

6. In combination with the truck-frame or running-gear and body-sections vibratively connected thereto and provided with recessed plates O', the jack L' pivotally mounted below the body-sections and provided with a piston having a cone-shaped head adapted to seat itself in the recesses of the plates O', substantially as and for the purpose set forth.

7. In combination with the crane S' rotatively mounted in keepers Q', R', secured to the body-sections and provided with a hanging pulley T', a handle Z' secured to the crane S' and supported upon the keeper Q', substantially as and for the purposes set forth.

In testimony whereof I affix my signature in presence of two witnesses.

JAMES C. ANDERSON.

Witnesses:
   JNO. J. HARROWER,
   WM. C. MCINTIRE.